Figure 1:
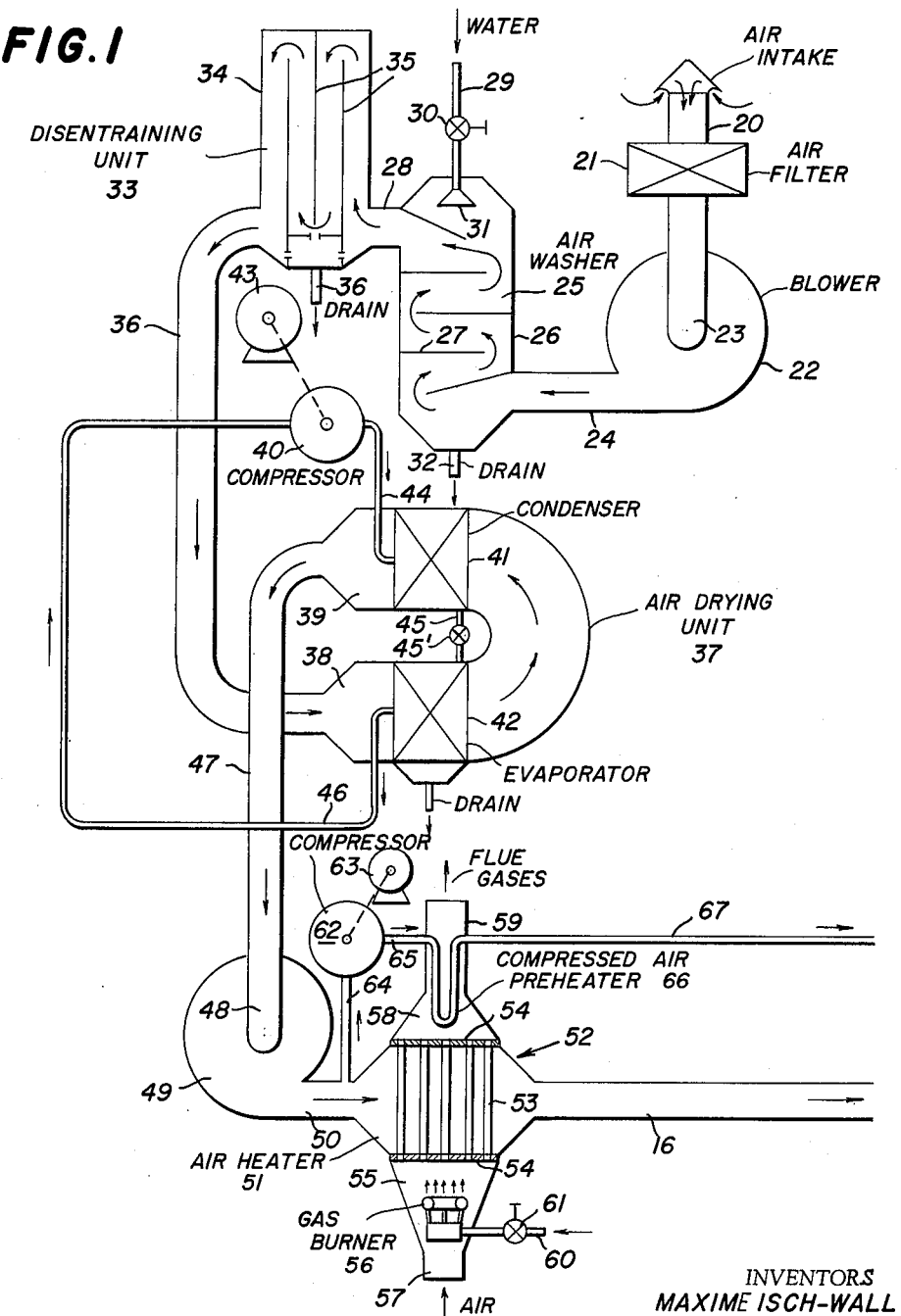

Nov. 30, 1965  M. ISCH-WALL ETAL  3,220,118
SYSTEMS FOR TREATING AGGLOMERATED PRODUCTS
Filed Sept. 24, 1962  4 Sheets-Sheet 4

INVENTORS
MAXIME ISCH-WALL
CLAUDE AUSSET
BY
ATTYS.

3,220,118
SYSTEMS FOR TREATING AGGLOMERATED PRODUCTS
Maxime Isch-Wall and Claude Ausset, Paris, France, assignors to General American Transportation Corporation, Chicago, Ill., a corporation of New York
Filed Sept. 24, 1962, Ser. No. 225,613
Claims priority, application France, Dec. 27, 1961, 883,031
4 Claims. (Cl. 34—57)

The present invention relates to systems for treating agglomerated products, such, for example, as sodium chlorate, ferrous sulfate, ferrocyanides, aluminum hydroxide, magnesium hydroxide, ferrous hydroxide, ferric hydroxide, certain plastic resins, such as polyvinyl chloride, etc.

It is a general object of the invention to provide an improved system for treating an agglomerated product, wherein the agglomerated product is first physically reduced to a corresponding particulated product and then the particulated product is subject to another treatment step in a fluidized bed of such particulated product, whereby heating, drying, cooling, reacting and like steps may be greatly facilitated in the fluidized bed of the particulated product.

Another object of the invention is to provide a system for treating an agglomerated product that essentially comprises facility for passing a main stream of gas upwardly through a chamber containing a mass of particulated product at a velocity to form and to maintain a fluidized bed of the particulated product in the chamber, facility for projecting a side stream of gas into the fluidized bed maintained in the chamber, facility for grinding the agglomerated product into a particulated product, facility for feeding the particulated product into the side stream so that it is projected therein into the fluidized bed maintained in the chamber, and facility for removing to the exterior of the chamber the particulated product from the fluidized bed maintained in the chamber.

Another object of the invention is to provide a system of the character described, wherein the main stream of gas supplied to the chamber is hot and dry, and the agglomerated product is initially wet, whereby the wet agglomerated product is ground into a corresponding wet particulated product, and the wet particulated product is fed into the side stream of gas that is projected into the hot dry fluidized bed maintained in the chamber, with the result that the wet particulated product is quickly dried in the hot dry fluidized bed maintained in the chamber, and dry particulated product is removed from the fluidized bed maintained in the chamber.

Another object of the invention is to provide a system of the character described that is particularly well suited to the conversion of wet agglomerated sodium chlorate to dry particulated sodium chlorate.

A further object of the invention is to provide a system for treating agglomerated product so as to produce therefrom a corresponding particulated product, wherein the system essentially comprises an upstanding tubular shell defining a corresponding upstanding chamber, a mass of particulated product contained in the chamber, facility for passing a main stream of gas into the bottom of the shell and upwardly through the chamber and out of the top of the shell at a velocity to form and to maintain in a fluidized bed the mass of particulated product contained in the chamber, a grinding machine carried by the shell and operative to reduce agglomerated product to particulated product and to discharge the particulated product into the shell intermediate the top and the bottom of the chamber, facility including a nozzle for projecting a side stream of gas into the fluidized bed, wherein the nozzle cooperates with the grinding machine so that the particulated product discharged therefrom is projected in the side stream of gas into the fluidized bed, whereby the treatment of the particulated product in the fluidized bed is greatly facilitated, and facility for removing to the exterior of the shell treated particulated product from the fluidized bed.

A further object of the invention is to provide a system of the character described that is especially designed to effect heating and drying of wet particulated product in the fluidized bed, and further comprising improved facility for supplying hot dry air into the bottom of the shell to produce the corresponding main stream upwardly through the chamber for the purpose of forming and of maintaining the fluidized bed of the particulated product in a hot dry condition in the chamber.

A further object of the invention is to provide a system of the character described and comprising improved arrangement of facility for producing a current of air, facility for washing the air current, facility for disentraining moisture for the air current, facility for cooling the air current to effect drying thereof, and facility for heating the air current, thereby to produce the hot dry air that is supplied as the main hot dry air stream into the bottom of the shell.

A further object of the invention is to provide a system of the character described, wherein the grinding machine incorporated therein is of improved and simplified construction and arrangement, so that it is suitable for the reduction of a wide variety of agglomerated products into corresponding particulated products preceding further treatment of any one of the particulated products in the fluidized bed maintained in the chamber defined in the shell.

Further features of the invention pertain to the particular arrangement of the elements of the system, whereby the above-outlined and additional operating features thereof are attained.

Figure 2:
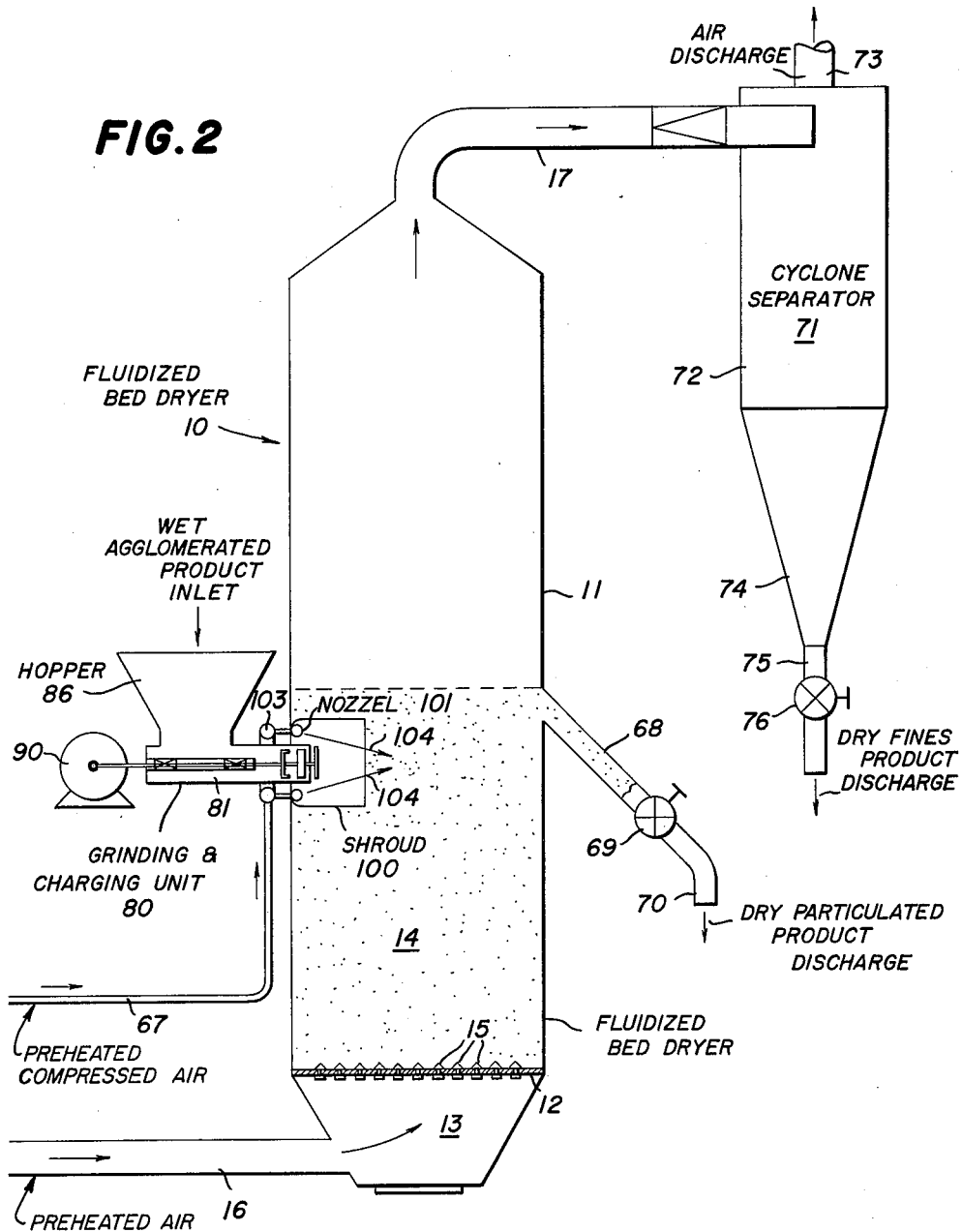
Figure 3:
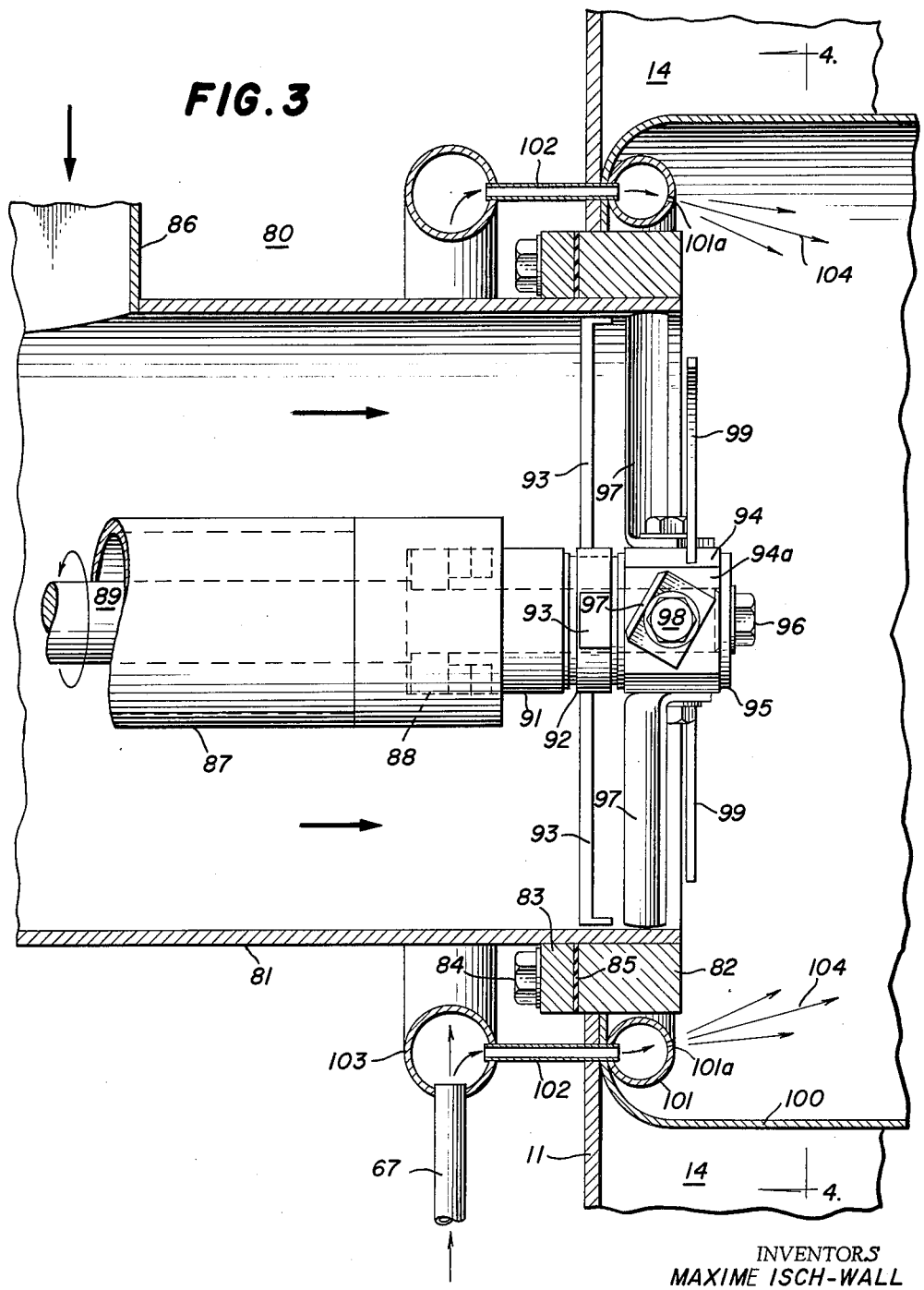
Figure 4:
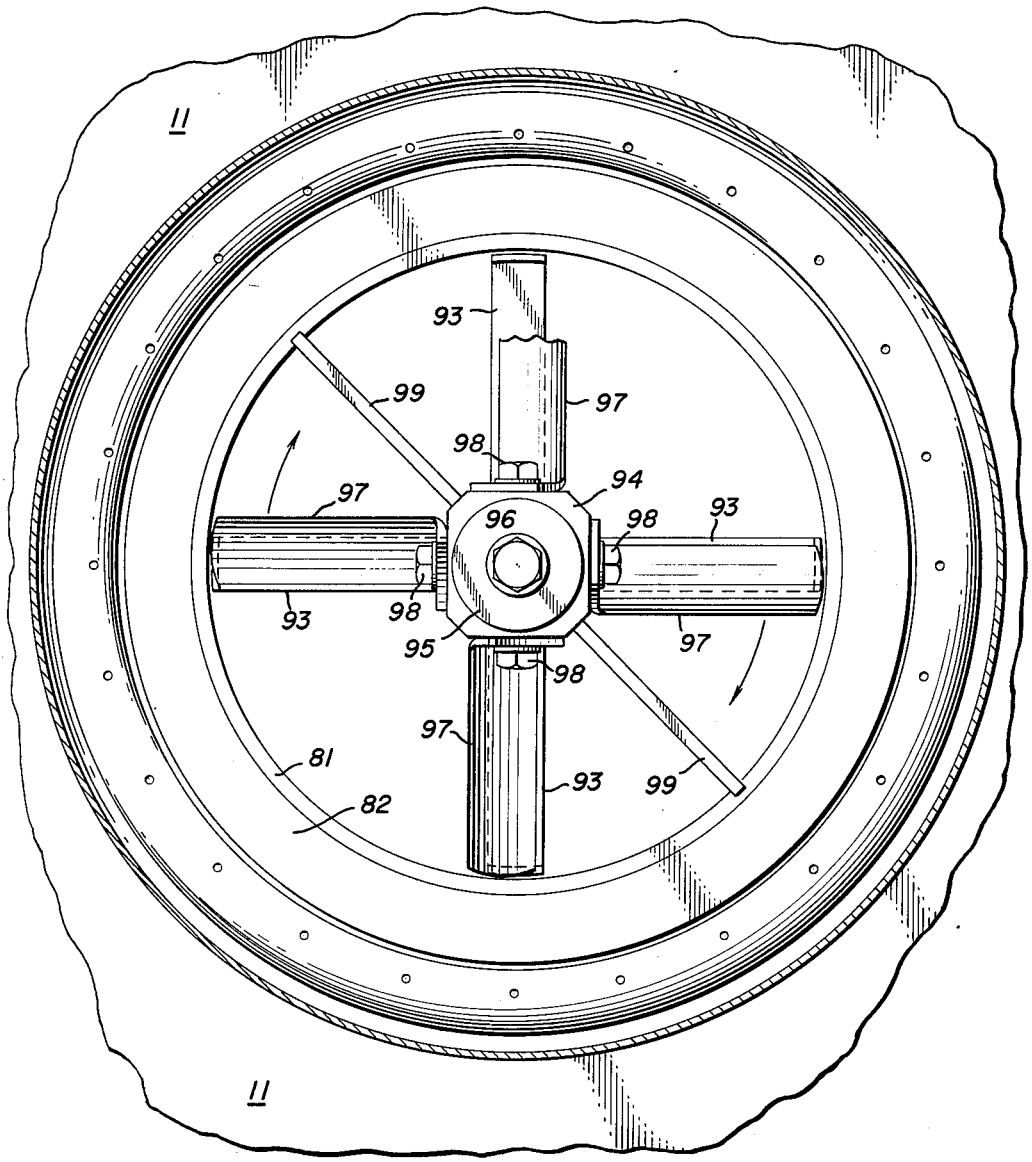

The invention, both as to its organization and method of operation, together with further objects and advantages thereof, will best be understood by reference to the following specification, taken in connection with the accompanying drawings, in which:

FIGURES 1 and 2, taken together, comprise a schematic diagram of a system embodying the present invention;

FIG. 3 is an enlarged fragmentary longitudinal vertical sectional view of the inner end of the grinding machine incorporated in the system, as shown in FIG. 2; and FIG. 4 is an enlarged fragmentary lateral vertical sectional view of the inner end of the grinding machine, this view being taken in the direction of the arrows along the line 4—4 in FIG. 3.

The system of the present invention is generally applicable to the treatment of a wide variety of agglomerated products, wherein it is desirable first to reduce the agglomerated product to a corresponding particulated product, and then to subject the particulated product to an additional treatment step, such as heating, drying, cooling, reacting, etc., in a fluidized bed of the particulated product. Specifically, the system is particularly suitable for the conversion of wet agglomerated sodium chlorate into dry particulated sodium chlorate, as pointed out in a specific example appearing hereinafter.

Referring now to FIGS. 1 and 2, taken together, of the drawings, there is illustrated a drying system embodying the features of the present invention; which system comprises a fluidized bed dryer 10 that may be of the fundamental construction and arrangement of that disclosed in U.S. Patent No. 3,040,439, granted on June 26, 1962, to William G. Frost. Specifically, the dryer 10 comprises an upstanding tubular shell 11 carrying within the lower portion thereof a diffuser plate 12 that divides the interior of the shell 11 into a lower windbox 13 and an upper treatment chamber 14. A great plurality of holes are provided in the diffuser plate 12 and a corresponding plurality of nozzle elements 15 are respectively arranged in the holes mentioned; which nozzle elements 15 accommodate the passage of gas supplied into the windbox 13 via an inlet conduit 16 from the windbox 13 through the diffuser plate 12 and thence upwardly through the treatment chamber 14 and ultimately out of the top of the shell 11 via an outlet conduit 17. The treatment chamber 14 contains a mass of particulated product, whereby the upwardly directed main stream of gas passing through the treatment chamber 14 forms and maintains the mass of particulated product into a fluidized bed contained in the treatment chamber 14, the velocity of the main stream of gas mentioned being appropriate, in view of the character of the product, to achieve the result noted, as is well understood in this art.

In the system, air is employed in the main stream passing upwardly through the treatment chamber 14; whereby the system further comprises an air intake stack 20, an air filter 21 connected to the stack 20, and a blower 22 provided with an inlet 23 connected to the air filter 21 and an outlet 24 connected to the bottom of an air washer 25. The air washer 25 comprises an upstanding casing 26 that is suitably baffled, as indicated at 27; whereby the filtered air is blown upwardly through the baffles 27 in the casing 26 and ultimately out of the upper portion of the casing 26 via a conduit 28. Also, the air washer 25 comprises a water supply pipe 29 containing a manual control valve 30 and connected to a water nozzle 31 arranged in the top of the casing 26; whereby a shower of water may be projected downwardly through the casing 26 and into washing relation with the upwardly directed air current therethrough. The water mentioned accumulates in a sump formed in the bottom of the casing 26 and is removed to the exterior thereof via a communicating drain conduit 32. The conduit 28 communicates with a disentrainment unit 33 that comprises a casing 34 containing baffles, indicated at 35, whereby the washed air passes through the casing 34 making a series of abrupt changes in the direction of movement thereof, with the result that substantially all of the water entrained in the air is disentrained therefrom in the unit 33, the water being conducted from the casing 34 via a drain conduit 36. The air passes through the unit 33 and into a conduit 36, whereby the air in the conduit 36 is substantially 100% saturated, but devoid of entrained water.

Further, the system comprises an air drying unit 37 that includes lower and upper communicating casing sections 38 and 39 and a cooperating refrigerating machine of the compressor-condenser-evaporator type. Specifically, the refrigerating machine mentioned includes the compressor 40, the condenser 41 housed in the casing section 39, and the evaporator 42 housed in the casing section 38. The compressor 40 is driven by a connected electric drive motor 43; the outlet of the compressor 40 is connected by a conduit 44 to the inlet of the condenser 41; the outlet of the condenser 41 is connected by conduit 45 containing an expansion valve 45' to the inlet of the evaporator 42; and the outlet of the evaporator 42 is connected by a conduit 46 to the inlet of the compressor 40. The refrigerating machine contains a suitable refrigerant, such as "F12"; whereby the same is operative to effect cooling of the evaporator 42 and heating of the condenser 41 in a well-known manner. The air from the conduit 36 is circulated through the air drying unit 37 and thence into a conduit 47 that is connected to the inlet 48 of a blower 49 that is provided with an outlet 50.

The air passes from the conduit 36 into the casing section 38 and into heat-exchange relation with the evaporator 42, and then passes into the casing section 39 and into heat-exchange relation with the condenser 41, and ultimately passes into the conduit 47. In the casing section 38 the air is substantially cooled below the ambient so as to effect the freezing of moisture therefrom; and in the casing section 39 the air is substantially heated; whereby in the overall operation of the air drying unit 37 the temperature of the air in the conduit 47 is somewhat higher than that of the air in the conduit 36; however, the air in the conduit 47 is much drier than the air in the conduit 36, due to the freezing-out of moisture therefrom by the evaporator 42, as noted above. In fact, the relative humidity of the air in the conduit 36 may be 10% at ambient temperature, while the relative humidity of the air in the conduit 47 may be only about 10% at the temperature only several degrees above the ambient temperature.

Further, the system comprises an air heater 51 of the fire-tube type, including a casing 52 housing a plurality of fire tubes 53 extending between two header plates 54. Also the casing 52 includes an inlet connected to the blower outlet 50 and an outlet 52 connected to the conduit 16 that communicates with the windbox 13 provided in the fluidized bed dryer 10, as previously noted. Further, the casing 52 comprises a combustion chamber section 55 housing a gas burner 56 and provided with an intake air pipe 57, as well as a flue gas section 58 provided with a flue stack 59. The gas burner 56 is connected to a fuel gas supply pipe 60 in which there is arranged a manual control valve 61. In the air heater 51, fuel gas is supplied to the gas burner 56 via the gas pipe 60 and air is supplied to the gas burner 56 via the intake air pipe 57, whereby the fuel gas is burned in the combustion chamber, and the combustion product passes through the fire tubes 53 into the flue gas chamber and thence via the flue stack 59 to the exterior. Of course, the dry air passing from the conduit 50 around the fire tubes 53 in the casing 52 is heated and is then supplied via the conduit 16 into the windbox 13, as previously explained.

Also, in conjunction with the air heater 51 there is provided an air compressor 62 that is driven by a connected electric drive motor 63; which air compressor 62 is provided with an inlet that is connected by a conduit 64 to the blower outlet 50; and which air compressor 62 is provided with an outlet that is connected by a conduit 65 to a compressed air preheater coil 66 that is arranged in the flue gas chamber of the air heater 51. Finally, the compressed air preheater coil 66 is connected to a conduit 67; and which hot compressed air in the conduit 67 is employed for a purpose more fully explained hereinafter. In the arrangement, the dry air in the blower outlet 50 is drawn via the conduit 64 into the air compressor 62 and compressed therein to a pressure of several atmospheres and then discharged therefrom via the conduit 65 into the compressed air preheater 66. Of course the compressed air is heated in the compressed air preheater 66 and discharged into the conduit 67 for use, as will be explained hereinafter.

Further, the fluidized bed dryer 10 comprises a side arm 68 that communicates with the intermediate portion of the shell 11 and with the adjacent portion of the treatment chamber 14; which side arm 68 is adapted to trap out some of the particulated product from the fluidized bed maintained in the treatment chamber 14; and which side arm 68 contains a manually operable valve 69 communicating with a dry particulated product discharge conduit 70 communicating with the exterior. Thus, it will be understood that the dry particulated product that is trapped in the side arm 68 may be discharged to the exterior of the shell 11 via the discharge conduit 70, when the valve 69 occupies its open position.

In the operation of the fluidized bed dryer 10 some dry fines of the product are produced that pass upwardly from the fluidized bed that is maintained in the treatment chamber 14 along with the main air stream that is discharged from the top of the shell 11 via the conduit 17; whereby the system further comprises a cyclone separator 71 that includes a casing 72 provided with an air discharge conduit 73 at the top thereof and communicating with the atmosphere. Also the casing 72 comprises the usual sump section 74 at the bottom thereof that is connected via a discharge conduit 75 to the exterior, the discharge conduit including a manually operable valve 76. In the operation of the cyclone separator 71, the product fines that are carried by the air in the conduit 17 are separated therefrom in the casing 72 and accumulated in sump section 74, with the discharge of the thus stripped air via the air discharge conduit 73 to the atmosphere. The product fines accumulated in the sump section 74 may be removed to the exterior via the discharge conduit 75, when the valve 76 is operated into its open position.

Referring now to FIGS. 2, 3 and 4, the fluidized bed dryer carries a cooperating grinding unit or machine 80 in which the wet agglomerated product is reduced to wet particulated product prior to the discharge thereof into the fluidized bed maintained in the treatment chamber 14; and more particularly, the grinding machine 80 comprises an elongated tubular casing 81 provided with an open inner end. An opening is provided in the side of the shell 11 at a position disposed intermediate the top and the bottom thereof; and into this opening there is supported and sealed in place a substantially annular mounting ring 82, the ring 82 being rigidly secured, as by welding, to the adjacent wall of the shell 11. An annular ring 83 is rigidly secured, as by welding, to the outer surface of the casing 81 adjacent to the inner end thereof. The inner end of the casing 81 projects into the mounting ring 82; the rings 82 and 83 are securely fastened together by an annular array of bolts 84; and a sealing gasket 85 of ring-like form is arranged between the rings 82 and 83; whereby the casing 81 is removably mounted upon and supported by the mounting ring 82 carried by the shell 11, as best shown in FIG. 3. The outer end of the casing 81 carries an upwardly opening hopper 86 communicating therewith; which hopper 86 is of generally funnel-like configuration and is adapted to receive the wet agglomerated product that is to be ground into wet particulated product prior to further treatment thereof in the fluidized bed maintained in the treatment chamber 14.

The casing 81 houses a tubular sleeve 87 projecting thereinto from the extreme outer end thereof; which tubular sleeve 87 is rigidly secured and supported by the casing 81 and arranged therein in concentric relation therewith, the front end of the sleeve 87 terminating somewhat outwardly of the extreme inner end of the casing 81; and within the sleeve 87 and concentric with the longitudinal axis thereof there is rotatably mounted a shaft 89 upon a pair of bearings 88. The outer end of the shaft 89 projects outwardly from the outer end of the sleeve 87 and is connected to an electric drive motor 90, as shown in FIG. 1, whereby operation of the drive motor 90 effects relatively high speed rotation of the shaft 89 within the sleeve 87. The inner end of the shaft 89 projects inwardly of the inner end of the sleeve 87 and even inwardly of the inner end of the casing 81; and the inner end of the sleeve 87 is closed by an associated plug 91 of collar-like form, so as to prevent the entry of the particulated product contained in the casing 81 into the inner end of the sleeve 87, the plug 91 being securely fastened to the adjacent section of the shaft 89.

Adjacent to and inwardly of the plug 91 a ring-like collar 92 is carried by the shaft 89; which collar 92 carries four angularly spaced-apart radially extending arms 93, as best shown in FIGS. 3 and 4. Further, a block 94 is secured on the extreme inner end of the shaft 89 by a washer 95 and an associated bolt 96. The block 94 is generally square and includes four flat faces 94a disposed at substantially 90° with respect to each other; which four faces 94a respectively carry four radially extending arms 97 securely fastened thereto by four bolts 98. In the arrangement each of the arms 97 constitutes an air blade, so that the four blades 97 cooperate with each other to provide a fan or impeller. Finally, the block 94 carries inwardly of the blades 97 and slightly inwardly of the extreme inner end of the casing 81 a pair of diametrically opposed and radially extending arms 99. In the arrangement, the outer ends of the arms 93 and of the blades 97 are disposed adjacent to the interior surface of the casing 81, while the outer ends of the arms 99 slightly overlap the extreme inner end of the casing 81.

Further, a substantially cylindrical shroud 100 is provided that is secured to the mounting ring 82 and disposed in surrounding relation with the inner end of the casing 81. More particularly, the shroud 100 is arranged in the treatment chamber 14 adjacent to the corresponding side of the shell 11 and surrounds the mounting ring 82 and projects inwardly toward the vertical center line of the shell 11 terminating substantially outwardly of the center of the treatment chamber 14, as best shown in FIG. 1. Also, the outer end portion of the shroud 100 is spaced radially outwardly from the mounting block 82 to provide therebetween a substantially annular space in which there is arranged an annular nozzle 101 of tubular form, as best shown in FIG. 3. The nozzle 101 is connected by a plurality of supply tubes 102 to an annular manifold tube 103 surrounding the casing 81 adjacent to the ring 83 and connected to the compressed hot dry air conduit 67. A plurality of nozzle ports 101a are provided in the nozzle 101 and arranged in a generally circular disposition and directed both inwardly toward the longitudinal axis of the casing 81 and inwardly toward the longitudinal axis of the shell 11, as indicated by the converging lines 104, as shown in FIGS. 2 and 3.

In the operation of the grinding machine 80, the wet agglomerated product is fed from the hopper 86 into the outer end of the casing 81 in surrounding relation with the sleeve 87 and inwardly into the revolving elements 93, 97 and 99 carried by the rotating shaft 89, whereby the wet agglomerated product is broken-up or reduced to produce a corresponding wet particulated product that is then discharged from the inner end of the casing 81 into the outer end of the shroud 100. The hot dry compressed air supplied to the nozzle 101 is projected therefrom through the nozzle ports 101a to produce the previously described air cone 104 enclosing the inner end of the casing 81, whereby the wet particulated product discharged from the inner end of the casing 81 into the outer end of the shroud 100 is projected with the air in the air cone as a side stream into the fluidized bed maintained in the treatment chamber 14, with the result that the wet particulated product is rapidly dried in the fluidized bed to produce the corresponding dry particulated product in the fluidized bed. The moisture expelled from the wet particulated product in the fluidized bed is rapidly transported from the treatment chamber 14 with the main air stream through the conduit 17 and via the cyclone separator 71 and the air discharge conduit 73 to the atmosphere. Of course, the dry particulated product is removed from the fluidized bed maintained in the treatment chamber via the side arm 68 and the discharge conduit 70, when the valve 69 occupies its open position, as previously explained.

In the arrangement of the blades 97 of the fan incorporated in the grinding machine 80, the pitch is such as to cause the fan to propel air from the treatment chamber 14 into the inner end of the casing 81, when the shaft 89 is rotated in the clockwise direction, as viewed in FIG. 4; whereby this arrangement of the fan retards the flow of the wet particulated product inwardly through the casing 81, in the manner previously explained, with the result the wet particulated product is ground or subdivided into a substantially fine particulated form or condition in the inner end of the casing 81 prior to discharge therefrom. By employing blades 97 having a reverse pitch with respect to that of the blades 97 depicted, the rate at which the wet particulated product is passed through the inner end of the casing 81 may be substantially increased, with the result that the wet particulated product is ground or subdivided into a substantially coarse particulated form or condition in the inner end of the casing 81 prior to discharge therefrom. Further, some adjustment or control of the degree of subdivision fo the wet particulated product may be obtained by varying the speed of operation of the electric drive motor 90, the higher speeds of operation of the drive motor 90 favoring a higher degree of subdivision of the wet particulated product.

In the system, it is preferable that the longitudinal axis of the casing 81 be positioned substantially horizontal and thus normal to the longitudinal axis of the shell 11 that is disposed substantially in the vertical; and the shroud 100 is preferably arranged adjacent to the top of the fluidized bed that is maintained in the treatment chamber 14, but completely submerged therein, as illustrated in FIG. 2.

Considering now an example of the utilization of the system to effect the conversion of wet agglomerated sodium chlorate into dry particulated sodium chlorate, the grinding machine 80 is operated at the required speed to reduce the wet agglomerated sodium chlorate to wet particulated sodium chlorate of the desired mesh or fineness. The air heater is operated to heat the air supplied via the conduit 16 into the windbox 13 to a temperature in the general range 200° C. to 240° C. Under these operating conditions the wet agglomerated $NaClO_3$ containing about 2% $H_2O$ by weight is converted to dry particulated $NaClO_3$ containing about 0.02% $H_2O$ by weight; and the drying mentioned takes place substantially instantaneously upon projection of the wet particulated $NaClO_3$ in the side stream of hot dry compressed air into the hot dry fluidized bed of particulated $NaClO_3$ maintained in the treatment chamber 14.

In view of the above example it will be appreciated that a wide variety of agglomerated products may be first reduced to corresponding particulated products and then subjected to a desired treatment step in the fluidized bed of the fluidized bed dryer 10; which last-mentioned treatment step may comprise any such conventional treatment step, such as heating, drying, cooling, reacting, etc., as is well-known in this art.

In view of the foregoing it is apparent that there has been provided an improved system for treating an agglomerated product, wherein the agglomerated product is first ground to produce a corresponding particulated product and the particulated product is immediately projected into a fluidized bed for further treatment. The system comprises an improved arrangement of a grinding machine and a fluidized bed unit, wherein the grinding machine is directly carried by the shell of the fluidized bed unit, with the result that as the particulated product is discharged from the grinding machine it is immediately projected by a side stream of gas into the fluidized bed that is maintained in the adjacent treatment chamber defined by the shell. Moreover, the grinding machine mentioned is of improved construction and arrangement so that it is capable of reducing to desired particulated form a wide variety of agglomerated chemical products. Finally, the system is admirably suited to the conversion of wet agglomerated sodium chlorate into dry particulated sodium chlorate.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A system for treating an agglomerated product comprising structure defining an upstanding chamber adapted to contain a mass of particulated product, means for passing a main stream of gas into the bottom of said chamber and upwardly therethrough and out of the top of said chamber at a velocity to form and to maintain in a fluidized bed the mass of particulated product contained in said chamber, an elongated tubular casing having an inner end cooperating with an opening provided in said structure and sealed to said structure and communicating with said chamber intermediate the bottom and the top thereof, a hopper communicating with the outer end of said casing and adapted to receive agglomerated product to be treated, an elongated shaft arranged in said casing and mounted for rotation about its own axis, the inner end of said shaft being disposed in the inner end of said casing, a plurality of sets of arms arranged in the inner end of said casing and carried by said shaft and rotatable therewith, said sets of arms being disposed in longitudinally spaced-apart relation on the inner end of said shaft, each of said sets of arms including a plurality of individual radially extending arms disposed in angular spaced-apart relation, the outer ends of the arms in each of said sets being spaced radially inwardly with respect to the inner surface of the inner end of said casing and closely adjacent thereto, said hopper being adapted to effect the feed of the agglomerated product therefrom into the outer end of said casing and thence therethrough into the inner end of said casing and said sets of arms rotating with said shaft being adapted to strike and to break-up the agglomerated product to produce a particulated product therefrom and to discharge the particulated product from the inner end of said casing, means including a nozzle for projecting a side stream of gas into said fluidized bed, said nozzle cooperating with the inner end of said casing so that the particulated product discharged therefrom is projected in said side stream into said fluidized bed, and means for removing to the exterior of said chamber particulated product from said fluidized bed.

2. The system set forth in claim 1, wherein the individual arms of one of said sets comprise fan blades so that said one set constitutes a fan carried by the shaft and rotatable therewith and productive of a gas pressure differential between the inner end of said casing and the interior of said chamber incident to rotation of said shaft.

3. The system set forth in claim 1, wherein said nozzle is of tubular form and of substantially annular configuration and arranged in said chamber adjacent to the inner end of said casing and surrounding the same, said nozzle having a substantially annular array of nozzle ports therein directed both inwardly toward the longitudinal center line of said casing and inwardly toward the upstanding center line of said chamber, whereby the side stream of gas that is projected from said nozzle is directed through said nozzle ports both inwardly toward the longitudinal center line of said casing and inwardly toward the upstanding center line of said chamber so that the curtain of gas has a generally cone-shaped configuration enveloping the inner end of said casing with the result that the particulated product discharged from the inner end of said casing is projected in said curtain into said fluidized bed.

4. The system set forth in claim 1, and further comprising a tubular shroud arranged in said chamber and having an open outer end surrounding the inner end of said casing and communicating therewith and having an open inner end projecting inwardly well into said fluidized bed and communicating therewith, whereby the particulated product discharged from the inner end of said casing is received in the outer end of said shroud, and wherein said nozzle is arranged in the outer end of said shroud, whereby the particulated product received in the outer end of said shroud is projected in said side stream through said shroud and out of the inner end thereof into said fluidized bed.

References Cited by the Examiner

UNITED STATES PATENTS

| | | | |
|---|---|---|---|
| 1,847,261 | 3/1932 | Pawling | 259—151 |
| 1,953,091 | 4/1934 | Westberg et al. | 259—151 |
| 2,231,489 | 2/1941 | Anderson et al. | 259—151 |
| 2,411,592 | 11/1946 | Reeves | 23—288.3 X |
| 2,543,863 | 3/1951 | Martin. | |
| 2,561,393 | 7/1951 | Marshall | 159—4 |
| 2,786,742 | 3/1957 | McKinley et al. | 23—288.3 |

FOREIGN PATENTS

| | | |
|---|---|---|
| 15,231 | 9/1929 | Australia. |
| 163,549 | 5/1921 | Great Britain. |
| 285,035 | 5/1929 | Great Britain. |

OTHER REFERENCES

"Power," vol. 73, No. 24, June 16, 1931, pages 948 and 949.

WILLIAM F. O'DEA, *Primary Examiner.*

NORMAN YUDKOFF, *Examiner.*